US008873659B2

(12) United States Patent
Wang et al.

(10) Patent No.: US 8,873,659 B2
(45) Date of Patent: Oct. 28, 2014

(54) REDUCED PAIR ETHERNET TRANSMISSION SYSTEM (71) Applicant: Broadcom Corporation, Irvine, CA (US)

(72) Inventors: Peiqing Wang, Laguna Beach, CA (US); Linghsiao Wang, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 112 days.

(21) Appl. No.: 13/656,555

(22) Filed: Oct. 19, 2012

(65) Prior Publication Data

US 2014/0112376 A1    Apr. 24, 2014

(51) Int. Cl.
*H04L 5/12* (2006.01)

(52) U.S. Cl.
USPC ........... 375/265; 375/260; 375/262; 375/267; 375/341; 375/343; 375/346; 375/295; 375/316

(58) Field of Classification Search
CPC ..... H04L 1/0071; H04L 1/006; H04L 1/0057; H04L 1/0041; H04L 1/0045; H04L 1/0059; H04L 1/0072; H04L 1/009; H04L 25/0242; H04L 25/03203; H04L 1/004; H04L 27/04; H04L 5/0007; H03M 13/1515; H03M 13/23; H03M 13/256; H03M 13/258; H03M 13/2915; H03M 13/27; H03M 13/2707; H03M 13/25; H03M 13/2732; H03M 13/2771; H03M 13/2785; H03M 13/255; H03M 13/2703; H03M 13/2767; H03M 13/13

USPC ......... 375/265, 260, 262, 267, 295, 316, 341, 375/343, 346

See application file for complete search history.

(56) References Cited

U.S. PATENT DOCUMENTS

| 8,335,962 | B2* | 12/2012 | Eberlein et al. | 714/755 |
| 2010/0146363 | A1* | 6/2010 | Birru et al. | 714/752 |
| 2011/0206109 | A1* | 8/2011 | Agazzi et al. | 375/229 |
| 2012/0099427 | A1* | 4/2012 | Huang | 370/228 |
| 2012/0300792 | A1* | 11/2012 | Patel et al. | 370/476 |

OTHER PUBLICATIONS

"Gigabit Ethernet on Copper Cabling Infrastructures," Panduit Corp. 2003, retrieved from <http://hqwww.panduit.com/stellent/groups/mpm-op/documents/whitepaper/098766.pdf>.
"Ethernet 802.3 Networks," Aug. 5, 2008, retrieved from <http://www.bitmindframes.info/ethernet-8023-networks>.

(Continued)

*Primary Examiner* — Dhaval Patel
(74) *Attorney, Agent, or Firm* — McDermott Will & Emery LLP (57) ABSTRACT A system for reduced pair Ethernet transmission. The system includes an interleaver that is operable to receive sets of four code symbols from a physical channel sub-layer (PCS) encoder, wherein each code symbol of each set of four code symbols is associated with one of four channels, and interleave the sets of four code symbols to generate a plurality of interleaved code symbols. The system further includes a serializer that is operable to serialize the plurality of interleaved code symbols to generate a plurality of interleaved and serialized code symbols. The system further includes a transmitter that is operable to transmit the plurality of interleaved and serialized code symbols over an Ethernet medium comprising a single twisted pair of wires.

20 Claims, 6 Drawing Sheets (56) References Cited

OTHER PUBLICATIONS

"Lattice SC/M Broadcom 2.5 GbE Physical Layer Interoperability Over CX-4," Lattice Semiconductor Corporation, Aug. 2007, Technical Note TN1156, pp. 1-10.

Barrass, et al., "Ethernet alliance 10GBASE-T: 10 Gigabit Ethernet over Twisted-pair Copper", Aug. 2007, Version 1.0.

"DP83865 Gig PHYTER V 10/100/1000 Ethernet Physical Layer," National Semiconductor, Oct. 2004, pp. 49-62, retrieved from <www.ti.com/lit/ds/symlink/dp83865.pds>.

"Jameco Electronics Part No. 1266468," National Semiconductor 2004, pp. 1-86.

Lo Bello, "The case for Ethernet in Automotive Communications," 10th International Workshop on Real-time Networks (RTN 2011), retrieved from <http://sigbed.seas.upenn.edu/archives/2011-12/keynote.pdf>.

"Physical Coding Sublayer (PCS), Physical Medium Attachment (PMA) sublayer and baseband medium, type 1000BASE-T", IEEE Std. 802-3 (2008) pp. 151-235.

"Reduced Pair 1 Gb/s Ethernet," retrieved from <grouper.ieee.org/groups/802/3/cfi/request_0312_1.html> on Jul. 30, 2012.

"Interleaving" 2010, retrieved from <http://eshare/stut.edu.tw/EshareFile/2010-6/2010_6_42ec6483.pdf>.

\* cited by examiner

REDUCED PAIR ETHERNET TRANSMISSION SYSTEM

TECHNICAL FIELD

The present description relates generally to an Ethernet transmission system, and more particularly, but not exclusively, to a reduced pair Ethernet transmission system.

BACKGROUND

The Ethernet networking protocol has become one of the most common networking protocols in use today. Due to the wide availability of Ethernet, and its large install base, Ethernet is generally able to provide a greater cost performance than other networking protocols. Accordingly, there has been a recent demand for implementations of Ethernet interfaces, such as Gigabit Ethernet interfaces, across a wide array of industries.

Gigabit Ethernet is capable of data transmission speeds of up to 1 Gigabit per second (Gbit/s) over four twisted pairs of wires. A twisted pair of wires, or a "twisted pair," may refer to a type of cabling where two conductors of a single circuit are twisted together for purposes of cancelling out interference from external sources, such as crosstalk or electromagnetic interference (EMI). For example, each wire of the twisted pair may carry an equal and opposite signal relative to the other wire of the twisted pair, and a receiving device may determine the difference between the two received signals in order to identify and remove noise. In the physical layer defined for Gigabit Ethernet (GPHY), an eight bit byte of data is translated into four code symbols, each of which is simultaneously transmitted over one of the four twisted pairs. Thus, each twisted pair effectively operates as a channel that carries one of four code symbols for each eight bit byte of data that is transmitted. The four channels of the GPHY may be referred to as channels A-D. The GPHY may inherently mitigate the effects of error bursts since each of the four code symbols of a given eight bit byte of data is transmitted over a separate twisted pair. Thus, an error burst experienced by any one of the twisted pairs, such as due to EMI, should only effect one of the four code symbols of a given eight bit byte of data, and therefore the entire eight bit byte of data may be recoverable at the receiving device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

Figure 1:
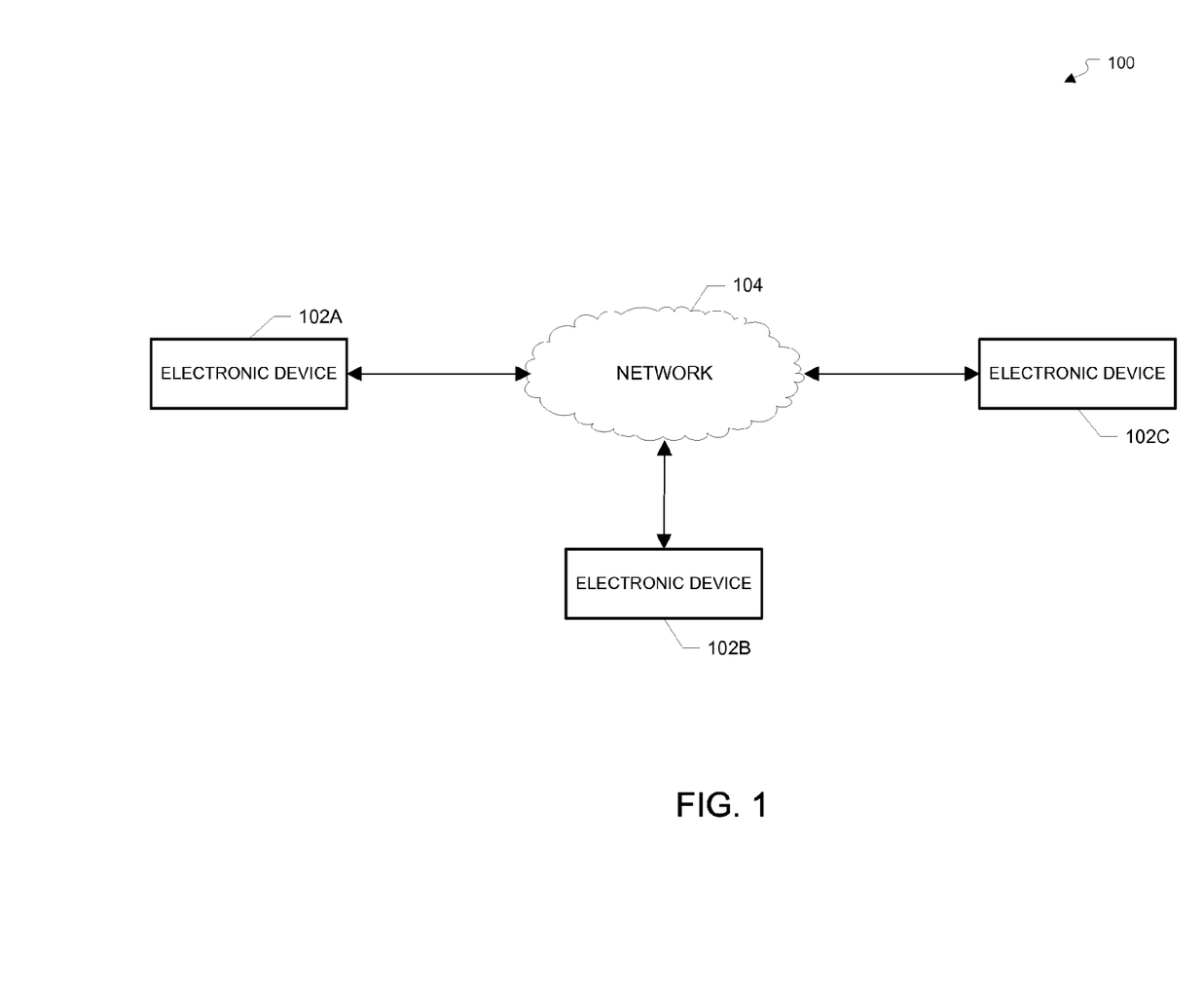
FIG. 1 illustrates an example network environment implementing a system for reduced pair Ethernet transmission in accordance with one or more implementations.

FIG. 1 illustrates an example network environment 100 which may implement a reduced pair Ethernet transmission system. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The network environment 100 may include a number of electronic devices 102A-C that are communicably coupled to one another, such as by the network 104. In one or more implementations, one or more of the electronic devices 102A-C may be communicatively coupled directly to one another, such as without the support of the network 104. The network 104 may be a public communication network (such as the Internet, cellular data network, dialup modems over a telephone network) or a private communications network (such as private local area network ("LAN"), leased lines). The network 104 may also include, but is not limited to, any one or more of the following network topologies, including a bus network, a star network, a ring network, a mesh network, a star-bus network, a tree or hierarchical network, and the like.

The network 104 may be, or may include, one or more network devices, such as a switch, router, etc. The electronic devices 102A-C may communicate with one another through the network 104, and/or through direct connections between the electronic devices 102A-C. The electronic devices 102A-C may include a memory and/or a processor. In one or more implementations, any of the electronic devices 102A-C may include, or may be, the electronic system 600 of FIG. 6.

In one or more implementations, the network environment 100 may be implemented within a vehicle, such as a car. For example, the electronic devices 102A-C may include, or may be coupled to, various systems within a vehicle, such as a powertrain system, a chassis system, a telematics system, an entertainment system, or generally any system that may be used in a vehicle. In one or more implementations, the network 104 may be a switch or hub that is communicatively coupled to the electronic devices 102A-C, and may further be, in one or more implementations, communicatively coupled to a public communication network, such as the Internet.

The electronic devices 102A-C may be physically coupled to the network 104, or to one another, using two twisted pairs of wires, or one twisted pair of wires, rather than four twisted pairs of wires. The reduction in twisted pairs of wires for the physical communication channel may be referred to as reduced pair Ethernet. Reducing the number of twisted pairs may reduce the size and weight of the Ethernet wiring, as well as allow for a smaller form-factor interface.

In one or more implementations, the electronic devices 102A-C may implement a physical layer (PHY) that is interoperable with one or more aspects of the GPHY described in the Institute of Electrical and Electronics Engineers (IEEE) 802.3 Standards. In one or more implementations, the PHY of the electronic devices 102A-C may preserve coding groups of the physical coding sub-layer (PCS) of the GPHY, the link state transitions of the GPHY, and the PCS status functional code definition of the GPHY, in addition to being able to carry out any future functions defined for the GPHY. In one or more implementations, the PHY of the electronic devices 102A-C may utilize the four-dimensional (4D) 8-state Trellis-Code Modulation (TCM) used by the GPHY, and may therefore be able to obtain the 6-dB coding gain associated with the use of TCM in the GPHY.

The transmit portion of the PHY of the electronic devices 102A-C may include a PCS encoder, such as the PCS encoder defined for the GPHY that utilizes 4D 8-state TCM. The PCS encoder may encode eight bit bytes of data into four-dimensional (4D) code symbols, such as by using the 8-state TCM. The individual code symbols may be encoded using distinct coding rules, such as the coding rules of the PCS encoder defined for the channels (A-D) of the GPHY. In this manner, the individual code symbols may be indirectly associated with one of the channels (A-D) and the channel associated with any code symbol may be determinable by identifying the channel coding rule that the code symbol satisfies. The PHY of the electronic devices 102A-C may further include an interleaver, such as a convolutional interleaver, that interleaves the 4D code symbols output by the PCS encoder. The PHY of the electronic devices 102A-C may further include a serializer that serializes the interleaved code symbols. The serialized and interleaved code symbols are transmitted over the one or two twisted pairs of wires to another of the electronic devices 102A-C. The another of the electronic devices 102A-C receives the serialized and interleaved code symbols over the one or two twisted pairs of wires.

The convolutional interleaver of the PHY protects any set of four code symbols (referred to as a codeword) by separating the four code symbols of the set with time delay that covers the average duration of an error burst during transmission. Thus, although the transmission of the set of four code symbols over one or two twisted pairs may be susceptible to error bursts, such as due to EMI and/or error propagation, the effects of error bursts during transmission may be mitigated by interleaving, e.g. temporally separating, the transmitted code symbols.

The receive portion of the PHY of the electronic devices 102A-C may include a deserializer and a deinterleaver, such as a convolutional deinterleaver, that deserialize and deinterleave the received code symbols. The convolutional deinterleaver may recover 4D soft-decisions that can be used by an 8-state TCM Viterbi decoder for branch metric calculations for all eight states. The deserialized and deinterleaved code symbols and the 4D soft-decisions may be provided to an error correction decoder, such as the 8-state TCM Viterbi decoder used in the GPHY. In one or more implementations, the path memory depth of the 8-state TCM Viterbi decoder may be increased in order to improve code gain, if the associated increase in latency is acceptable for the given implementation. The 8-state TCM decoder may perform error correction coding on the code symbols and may provide the recovered code symbols to a PCS decoder, such as the PCS decoder defined for the GPHY, for decoding the code symbols into the transmitted eight bit bytes of data.

The receive portion of the PHY of the electronic devices 102A-C may also determine the channel, or the "virtual" twisted pair, associated with received code symbols. In other words, even though the code symbols are transmitted over only one or two twisted pairs, the receiving device may deinterleave and deserialize the received code symbols into four separate streams that correspond to the four twisted pairs that the code symbols would have been transmitted over in a standard Gigabit Ethernet transmission. In this manner, the PHY of the electronic devices 102A-C may be maintain interoperability with one or more aspects of the GPHY.

The channel associated with any received code symbol may be determined using the distinct coding rules defined for the code symbol by the PCS encoder of the transmit portion of the PHY of the electronic devices 102A-C, such as the distinct coding rules used by the PCS encoder of the GPHY, which are discussed further below with respect to FIGS. 2-3. In one or more implementations, the coding rules may also be used to identify the boundaries of the symbols, such as by applying a coding rule associated with a first channel, such as channel A, at different boundaries until a symbol satisfying the coding rule is identified. In one or more implementations, the PCS decoder may control the deserializer to modify the symbol boundary. Once a symbol satisfying the equation for the first channel has been identified, the local scrambler of the receive portion of the PHY of the electronic device 102A-C may be converged.

In addition, the receive portion of the PHY of the electronic devices 102A-C may utilize the coding rules associated with the channels to identify a received code symbol corresponding to a second channel, such as channel D or channel B, in order to detect the interleaver depth parameter (M parameter) of the interleaver used by the transmitting device. The depth of the interleaver may refer to the minimum separation in symbol periods at the output of the interleaver between any two symbols that were adjacent at the input of the interleaver. The receive portion of the PHY of electronic devices 102A-C may also simultaneously detect an N parameter of the interleaver, where N is in the set of $\{0, 1\}$, such as by applying an exhaustive search. For example, if the M parameter is in the set of $\{0, 1, 2\}$, then a total of six combinations of (N, M) may be searched, where a zero value equates to no interleaving.

In one or more implementations in which the electronic devices 102A-C transmit data over a single twisted pair, the receive portion of the PHY of the electronic devices 102A-C may not need deskew buffers, such as the four buffers utilized in the GPHY to deskew the data received over the four pairs of twisted wires. However, in the one or more implementations where the electronic devices 102A-C transmit data over two twisted pairs, the receive portion of the PHY of the electronic devices 102A-C may utilize two deskew buffers, such as two first-in-first-out (FIFO) buffers, in order to deskew the data received over the two twisted pairs. In one or more implementations, the receive portion of the PHY of the electronic devices 102A-C may check the FIFO buffers at the same time as the detection of the N and M parameters by the exhaustive search.

Figure 2:
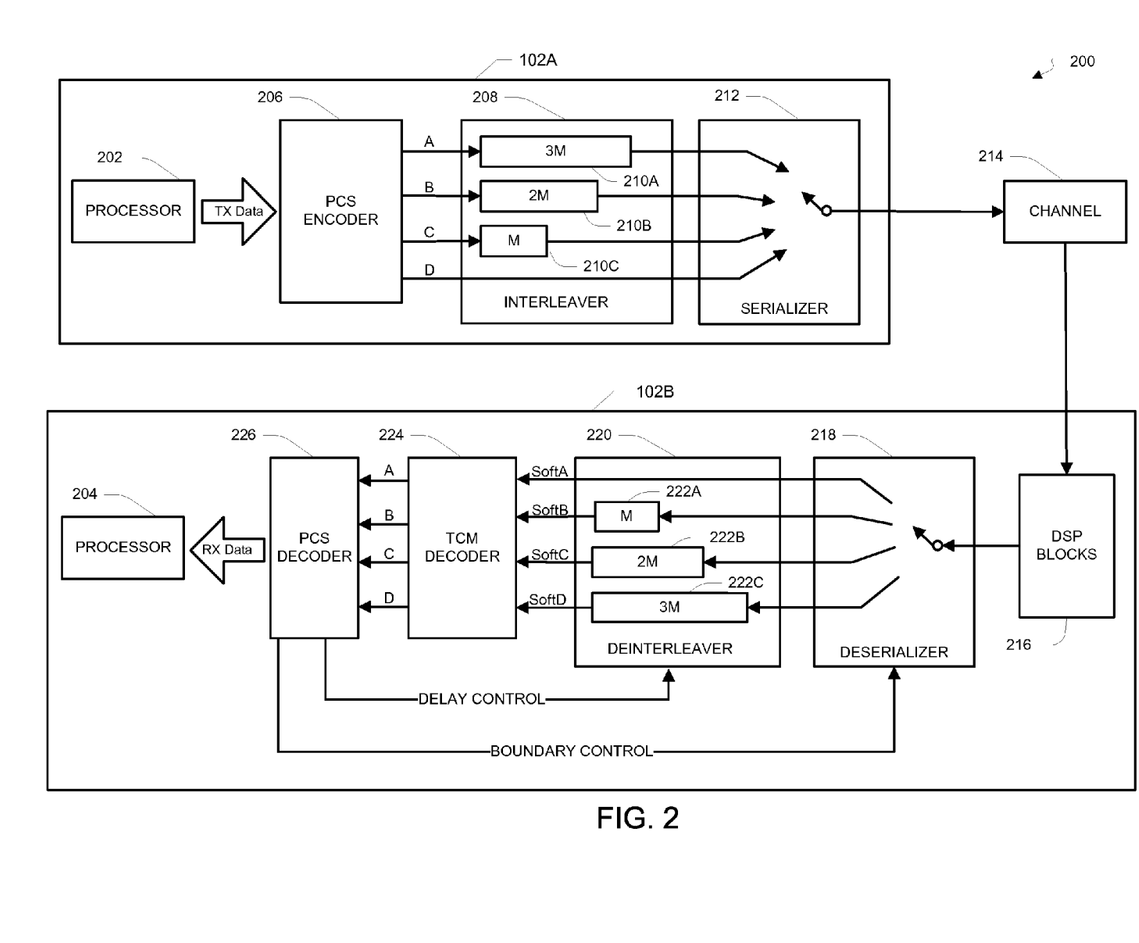
FIG. 2 illustrates an example system for reduced pair Ethernet transmission over a single twisted pair of wires in accordance with one or more implementations.

FIG. 2 illustrates an example system 200 for reduced pair Ethernet transmission over a single twisted pair of wires in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The example system 200 includes electronic devices 102A-B, and a channel 214. For explanatory purposes, the electronic device 102A is illustrated in FIG. 2, and described herein, with respect to the transmit portion of the PHY of the electronic devices 102A-C, and the electronic device 102B is illustrated in FIG. 2, and described herein, with respect to the receive portion of the PHY of the electronic devices 102A-C. However, any of the electronic devices 102A-C may include both the receive and transmit portions of the PHY. The channel 214 may be, or may include, a single twisted pair of wires. In one or more implementations, the channel 214 may further include, or may be coupled to, one or more network devices, such as switches, routers, etc.

The electronic device 102A includes a processor 202, a PCS encoder 206, an interleaver 208, and a serializer 212. The electronic device 102B includes a processor 204, a PCS decoder 226, a TCM decoder 224, a deinterleaver 220, a deserializer 218, and DSP blocks 216. The interleaver 208 includes the buffers 210A-C, and the deinterleaver 220 includes the buffers 222A-C. The digital signal processing (DSP) blocks 216 may include blocks for an automatic gain control (AGC), a feed-forward equalizer (FFE), a decision-feedback equalizer (DFE), or generally any functionality that can be implemented in digital signal processing.

In operation, the processor 202 of electronic device 102A may communicate, to the PCS encoder 206, data that is to be transmitted to the electronic device 102B. In one or more implementations, the PCS encoder 206 may be, or may include one or more aspects of, the PCS encoder defined for the GPHY. In one or more implementations, the data to be transmitted may be processed by one or more higher layers of electronic device 102A before being communicated to the PCS encoder 206. The PCS encoder 206 may encode eight bit bytes of the data into four-dimensional code symbols, such as by using an 8-state TCM. In one or more implementations, the individual code symbols of any four-dimensional set of code symbols may be coded using a distinct coding rule, such as the coding rules associated with the four channels A-D that correspond to the four twisted pairs of wires in the GPHY. In one or more implementations, the coding rules may relate to the scrambling equations used in the GPHY to randomize the signs of the four code symbols of a given set of code symbols in order to ensure that none of the four channels over which the sets of four code symbols are transmitted has DC bias. Thus, the code symbols may be indirectly associated with one of the channels A-D, e.g. through the coding rules, such that the channel associated with a given code symbol may be determinable by applying the corresponding coding rules to the code symbol.

The PCS encoder 206 transmits the sets of four code symbols to the interleaver 208. In one or more implementations, the interleaver 208 may be a convolutional interleaver. The interleaver 208 interleaves the sets of code symbols using the buffers 210A-C. In one or more implementations, the buffers 210A-C may collectively form a B-by-N triangular array of shift registers. The ith shift register may have a length of (i−1)*M stages, where M is equal to B divided by N. The shift registers may be clocked once every B symbols, and the oldest code symbol in the shift registers may be output to the serializer 212. In one or more implementations, the M parameter may be set to one and the B parameter may be set to four. In these one or more implementations, six registers may be utilized by the interleaver 208, the latency may be three symbol periods, and at least one 4D codeword (set of four coded symbols) may be protected because one symbol error may be correctable for a burst error length of four. In one or more implementations, the M parameter may be set to two and the B parameter may be set to four. In these one or more implementations, twelve registers may be utilized by the interleaver 208, the latency may be six symbol periods, and the number of protected symbols may be B times M (4*2) or eight. Thus, two 4D codewords may be protected and the system may be able to tolerate a burst error length of eight.

The serializer 212 may serialize the code symbols received from the interleaver 208 and may output the serial code symbol stream to the channel 214, such as through a physical medium dependent (PMD) transmitter. In one or more implementations, the channel 214 may be a single twisted pair of wires that is directly, or indirectly, connected to electronic devices 102A-B. In one or more implementations, the PMD transmitter may transmit the serial stream of code symbols over the channel 214 as five-level Pulse Amplitude Modulated signals.

The electronic device 102B may receive the code symbol stream via the channel 214, such as through a physical medium dependent (PMD) receiver. The DSP blocks 216 may perform digital signal processing on the received code symbol stream, such as AGC, FFE, DFE, etc. The code symbol stream may be provided to the deserializer 218. The deserializer 218 may deserialize the symbol stream and provide the deserialized code symbols to the deinterleaver 220.

In one or more implementations, the deinterleaver 220 may be a convolutional deinterleaver. The deinterleaver 220 may deinterleave the deserialized code symbols using the buffers 222A-C. In one or more implementations, the buffers 222A-C may collectively form an inverse structure of the triangular array shift registers utilized by the interleaver 208. Thus, if six shift registers are utilized in the interleaver 208, then six shift registers are also utilized in the deinterleaver 220, and code symbols that are delayed by (i−1)*M stages in the interleaver 208 may be delayed by (B−i)*M stages in the deinterleaver 220.

The deinterleaver 220 may provide the deinterleaved code symbols to the TCM decoder 224 in sets of four code symbols. In one or more implementations, the TCM decoder 224 may be a TCM/Viterbi decoder. The TCM decoder 224 may utilize the order of the four code symbols within the sets of four code symbols as soft decisions. The soft decisions may be used for the branch metrics calculations for all eight states of the TCM decoder 224. The TCM decoder 224 may recover or correct any recoverable or correctable errors in the sets of four code symbols. The TCM decoder 224 may provide the error corrected sets of four code symbols to the PCS decoder 226.

In one or more implementations, the PCS decoder 226 may be, or may include one or more aspects of, the GPHY PCS decoder. In one or more implementations, the PCS decoder 226, or another component of electronic device 102B, such as the deinterleaver 220, or the deserializer 218, may determine which of the received code symbols is associated with the first channel, e.g. channel A. For example the PCS decoder 226 may apply the coding rule associated with the first channel, e.g. channel A to the received symbols. If none of the received symbols satisfies the coding rule associated with the first channel, the PCS decoder 226 may send a control signal, or feedback, to the deserializer 218 that instructs the deserializer 218 to adjust the symbol boundary used to deserialize the symbol stream. The PCS decoder 226 may repeat this process until a code symbol that satisfies the coding rules associated with the first channel is identified. In one or more implementations, the PCS decoder 226 may be configured with the coding rules. In one or more other implementations, the PCS decoder 226, or another component of electronic device 102B, may learn the coding rules through one or more training sequences received from the electronic device 102A. Once the PCS decoder 226 determines the code symbol that is associated with channel A, the local scrambler of the PCS decoder 226 may be converged for the remaining channels.

In one or more implementations, the PCS decoder 226, and/or another component of the electronic device 102B, such as the deinterleaver 220 or the deserializer 218, may determine the depth of the interleaver 208 of electronic device 102A. In these one or more implementations, the PCS decoder 226 may use the coding rules associated with the channels to identify a received code symbol corresponding to second channel (other than channel A), such as channel D or channel B. The depth of the interleaver 208 of electronic device 102A may then be determined based on the separation between the code symbol associated with channel A, and the code symbol associated with channel D or channel B. The PCS decoder 226 may transmit control signaling to the deinterleaver 220 to adjust the delay of the deinterleaver 220 based on the determined depth of the interleaver 208, if necessary.

The PCS decoder 226 may decode the sets of four code symbols received from the TCM decoder 224 to generate the original eight bit bytes of the data. The PCS decoder 226 may provide the decoded data to the processor 204. In one or more implementations, the decoded data may be further processed with respect to one or more higher layers of electronic device 102B.

Figure 3:
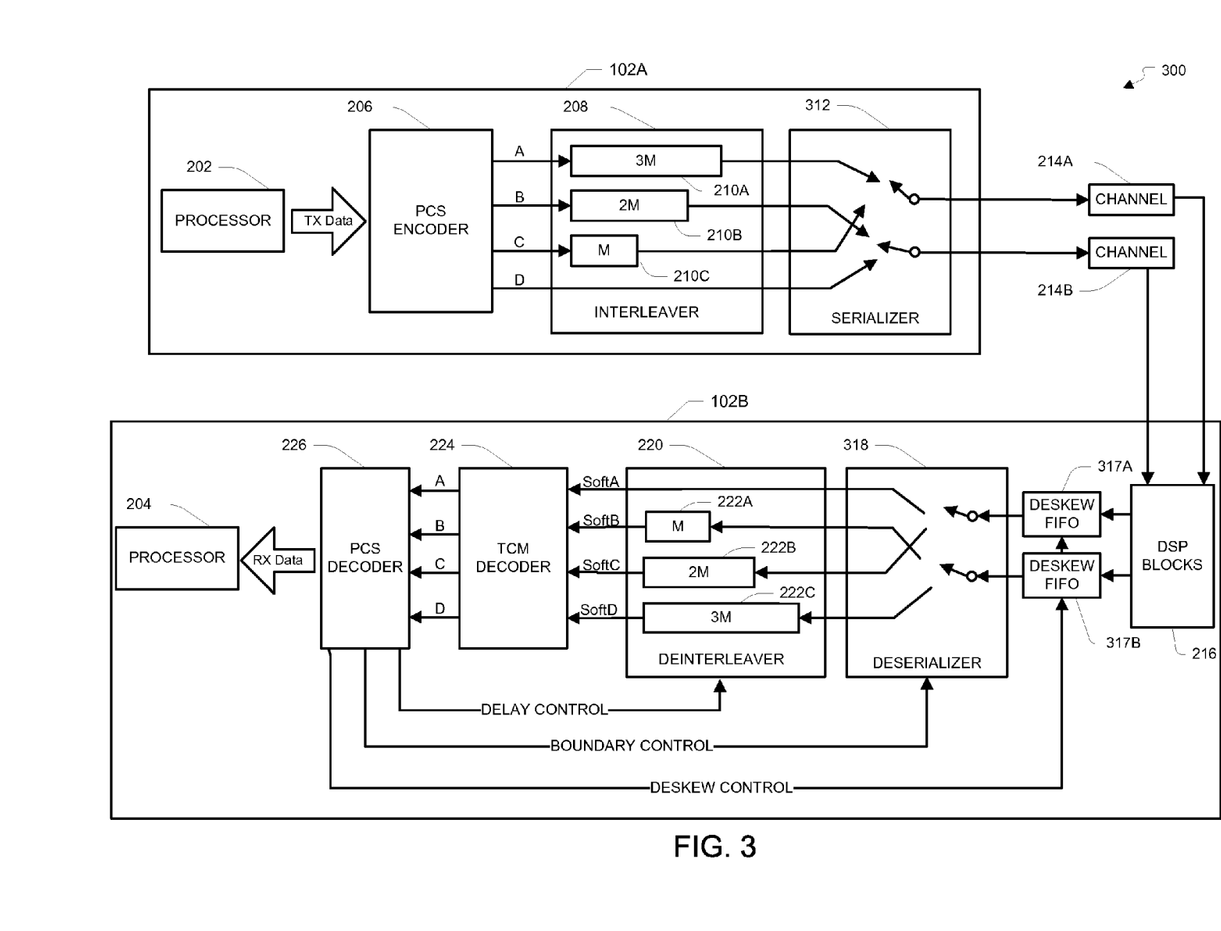
FIG. 3 illustrates an example system for reduced pair Ethernet transmission over two twisted pairs of wires in accordance with one or more implementations.

FIG. 3 illustrates a example system 300 for reduced pair Ethernet transmission over two twisted pairs of wires in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The example system 300 includes electronic devices 102A-B, and channels 214A-B. For explanatory purposes, the electronic device 102A is illustrated in FIG. 3, and described herein, with respect to the transmit portion of the PHY of the electronic devices 102A-C and the electronic device 102B is illustrated in FIG. 3, and described herein, with respect to the receive portion of the PHY of the electronic devices 102A-C. However, any of the electronic devices 102A-C may include both the receive and transmit portions of the PHY. The channels 214A-B may be, or may include, a single twisted pair of wires. Thus, the example system 300 collectively utilizes two twisted pairs of wires 214A-B to transmit data between the electronic devices 102A-B. In one or more implementations, the channels 214A-B may further include, or may be coupled to, one or more network devices, such as switches, routers, etc.

The electronic device 102A may include a processor 202, a PCS encoder 206, an interleaver 208, and a serializer 312. The electronic device 102B may include a processor 204, a PCS decoder 226, a TCM decoder 224, a deinterleaver 220, a deserializer 318, deskew FIFOs 317A-B, and DSP blocks 216. The interleaver 208 includes buffers 210A-C, and the deinterleaver 220 include buffers 222A-C. The digital signal processing (DSP) blocks 216 may include blocks for an automatic gain control (AGC), a feed-forward equalizer (FFE), a decision-feedback equalizer (DFE), or generally any functionality that can be implemented in digital signal processing.

In operation, the processor 202, the PCS encoder 206, and the interleaver 208 of the electronic device 102A may function as described above with respect to FIG. 2. The serializer 312 of electronic device 102A may generate two serial code symbol streams. In one or more implementations, the serializer 312 may generate the first serial code symbol stream by alternating between the first and third outputs of the interleaver 208, e.g. the code symbols associated with channels A and C, and the serializer 312 may generate the second serial code symbol stream by alternating between the second and fourth outputs of the interleaver 208, e.g. the code symbols associated with channels B and D. In one or more other implementations, the first and second serial symbol streams may be generated in other manners.

The serializer 312 may output the first serial code symbol stream to the first channel 214A, and the second serial code symbol stream to the second channel 214B. The DSP blocks 216 of the electronic device 102B may perform digital signal processing on the received code symbol streams. The received code symbol streams may then be provided to the deskew FIFOs 317A-B of electronic device 102B. The deskew FIFOs 317A-B may align the code symbol streams. In one or more implementations, the deskew FIFOs 317A-B may be, or may include one or more aspects of, the deskew buffers utilized in the GPHY.

In one or more implementations, the PCS decoder 226, or another component of the electronic device 102B, may send control signals to the deskew FIFOs 317A-B. In these one or more implementations, the PCS decoder 226 may determine that the code symbols received by the PCS decoder 226 are not properly aligned, such as upon identifying a code symbol associated with the first channel Thus, the PCS decoder 226 may send control signals to one or more of the deskew FIFOs 317A-B in order to adjust the deskew and properly align the code symbol streams.

The code symbol streams output by the deskew FIFOs 317A-B may be provided to the deserializer 318. The deserializer 318 may deserialize the code symbol streams in a manner that is inverse to the manner in which the code symbols were serialized by the serializer 312. In one or more implementations, the deserializer 318 may output deserialized code symbols from the first serial code symbol stream to the first and third inputs of the deinterleaver 220, and deserialized code symbols from the second serial code symbol stream to the second and fourth inputs of the deinterleaver 220. In one or more other implementations, the deserializer 318 may output deserialized code symbols in different manners. The deinterleaver 220, TCM decoder 224, PCS decoder 226, and processor 204 of the electronic device 102B may function as described above with respect to FIG. 2.

Figure 4:
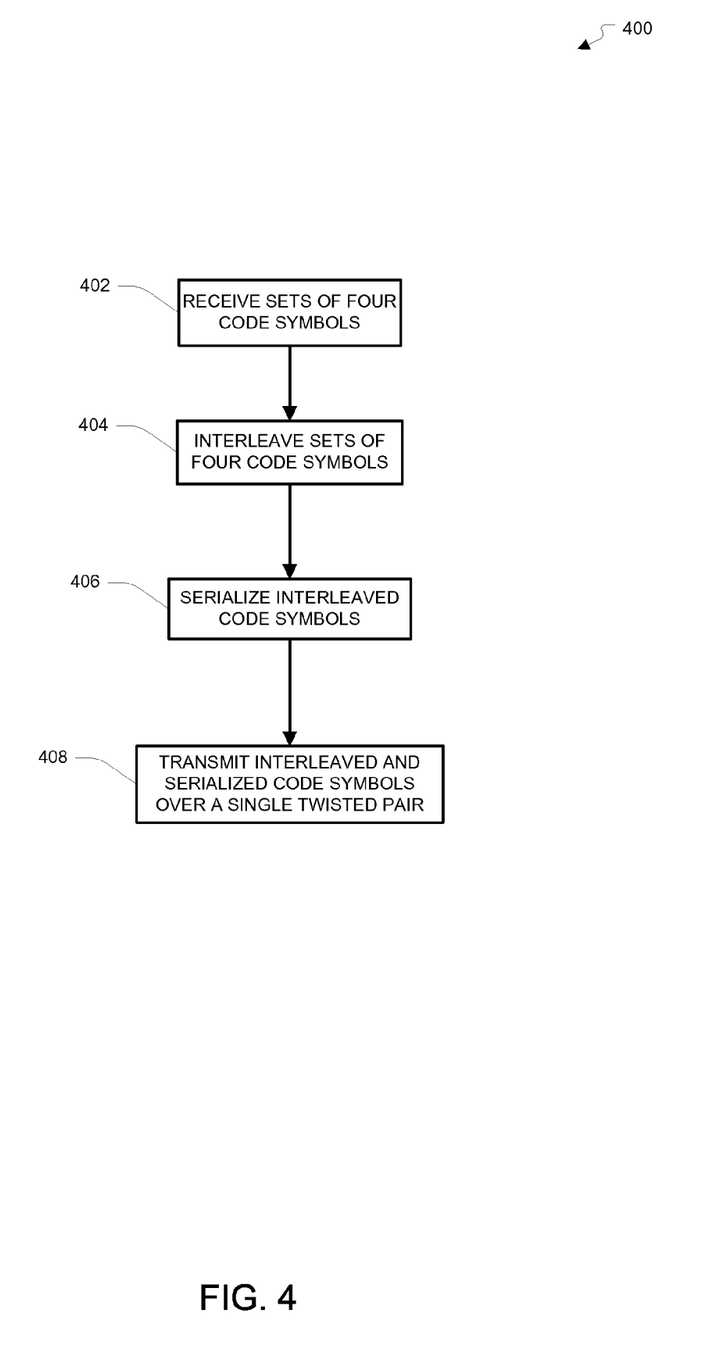
FIG. 4 illustrates a flow diagram of an example process for a transmitting device in a system for reduced pair Ethernet transmission in accordance with one or more implementations.

FIG. 4 illustrates a flow diagram of example process 400 for a transmitting device in a system for reduced pair Ethernet transmission in accordance with one or more implementations. For explanatory purposes, example process 400 is described herein with reference to example system 200 of FIG. 2 and example system 300 of FIG. 3; however, example process 400 is not limited to example system 200 of FIG. 2 or example system 300 of FIG. 3. Further for explanatory purposes, the blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

An interleaver of the electronic device 102A, such as interleaver 208, receives sets of four code symbols (referred to as codewords), such as from a PCS encoder 206 of the electronic device 102A (402). In one or more implementations, a code symbol of a codeword may be associated with one of four channels, and the associated channel may be determinable by processing the code symbol. In one or more implementations, a given codeword may include code symbols associated with the four channels.

The interleaver 208 of the electronic device 102A interleaves the sets of four code symbols (404) and provides the interleaved code symbols to a serializer of the electronic device 102A, such as serializer 212. The serializer 212 serializes the interleaved code symbols (406) into a single serial code symbol stream. The electronic device 102A transmits the single serial code symbol stream over a single twisted pair of wires (408), such as the channel 214.

Figure 5:
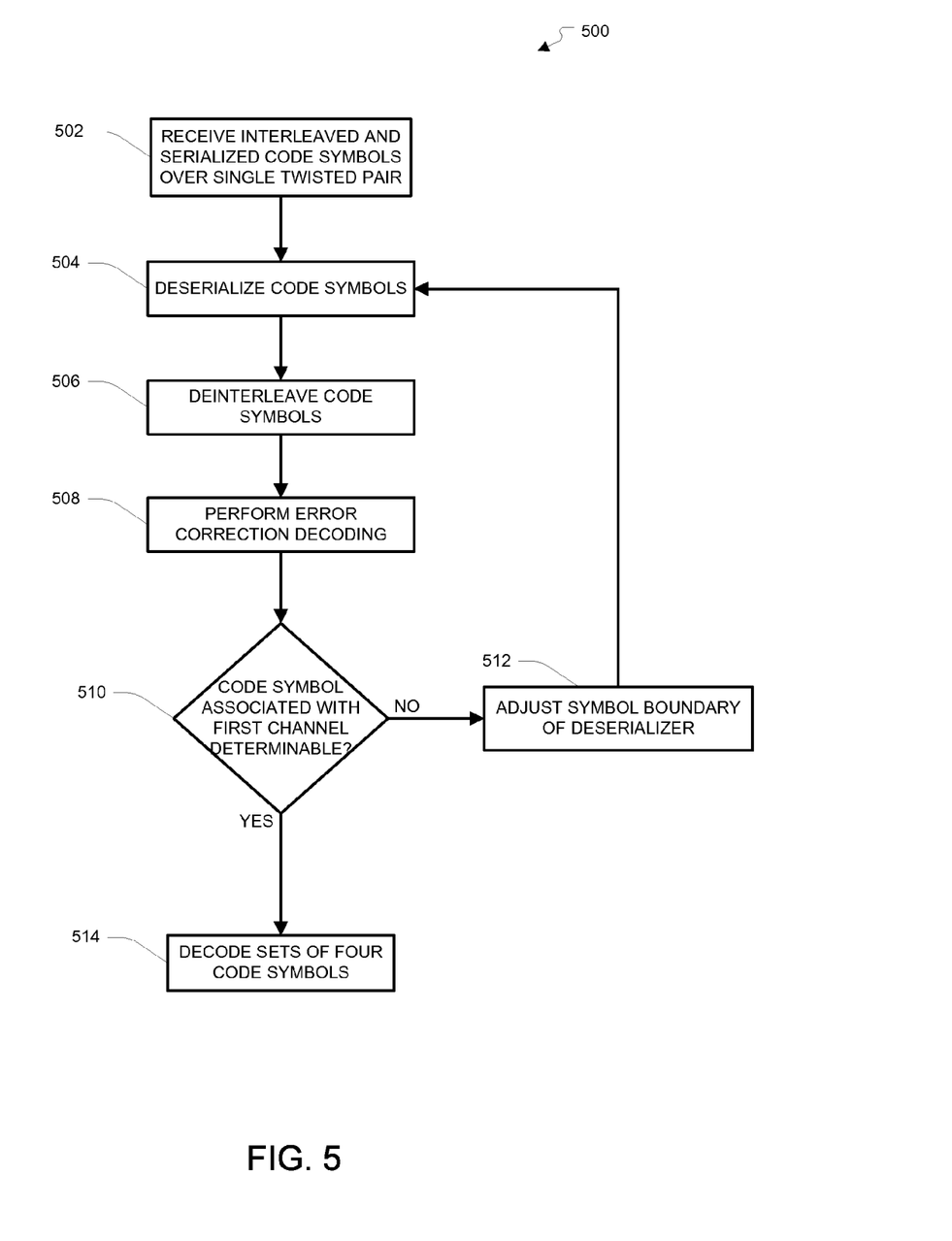
FIG. 5 illustrates a flow diagram an example process for a receiving device in a system for reduced pair Ethernet transmission in accordance with one or more implementations.

FIG. 5 illustrates a flow diagram of example process 500 for a receiving device in a system for reduced pair Ethernet transmission in accordance with one or more implementations. For explanatory purposes, example process 500 is described herein with reference to example system 200 of FIG. 2 and example system 300 of FIG. 3; however, example process 500 is not limited to example system 200 of FIG. 2 or example system 300 of FIG. 3. Further for explanatory purposes, the blocks of example process 500 are described herein as occurring in serial, or linearly. However, multiple blocks of example process 500 may occur in parallel. In addition, the blocks of example process 500 need not be performed in the order shown and/or one or more of the blocks of example process 500 need not be performed.

An electronic device 102B may receive a code symbol stream over a single twisted pair of wires (502), such as the channel 214. In one or more implementations, the code symbol stream may include interleaved and serialized code symbols. A deserializer of the electronic device 102B, such as deserializer 218, deserializes the received code symbol stream (504) to generate deserialized code symbols. A deinterleaver of the electronic device 102B, such as deinterleaver 220, deinterleaves the deserialized code symbols (506) to generate sets of four code symbols. An error correction decoder of the electronic device 102B, such as the TCM decoder 224, performs error correction decoding on the sets of four code symbols (508). In one or more implementations, the error correction decoder may be a TCM/Viterbi decoder.

A PCS decoder of the electronic device 102B, such as PCS decoder 226, attempts to determine a received code symbol that is associated with a first channel, such as channel A (510). In one or more implementations, the PCS decoder 226 may apply one or more coding rules, such as descrambling equations, associated with the first channel to the received code symbols in order to determine whether any of the received code symbols satisfies the coding rules associated with the first channel. If the PCS decoder 226 is unable to determine a code symbol associated with the first channel (510), the PCS decoder may adjust the symbol boundary of the deserializer 218, such as by sending a control signal to the deserializer 218 (512). The PCS decoder 226 may continue to process received code symbols (510) and adjust the symbol boundary of the deserializer 218 (512), until a code symbol associated with the first channel is determined.

If the PCS decoder 226 determines a code symbol that is associated with the first channel, e.g. a code symbol that satisfies the coding rules associated with the first channel, the PCS decoder 226 may converge its scrambler for the remaining channels and may decode sets of four code symbols into eight bit bytes of data (514). The eight bit bytes of data may be transmitted to a processor 204 of the electronic device 102B, or may be further processed with respect to higher layers in the electronic device 102B.

Figure 6:
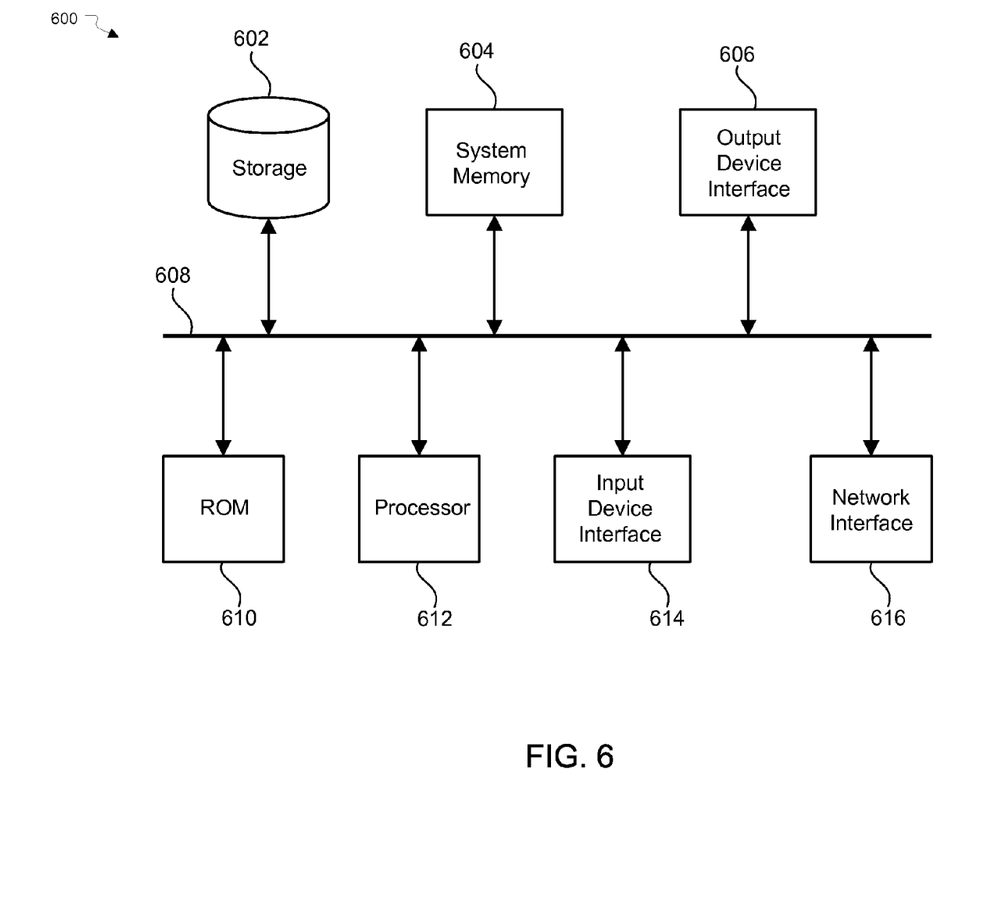
FIG. 6 conceptually illustrates an electronic system with which any implementations of the subject technology may be implemented.

FIG. 6 conceptually illustrates electronic system 600 with which any implementations of the subject technology are implemented. Electronic system 600, for example, can be a desktop computer, a laptop computer, a tablet computer, a server, a switch, a router, a base station, a receiver, a phone, a personal digital assistant (PDA), or generally any electronic device that transmits signals over a network. Such an electronic system includes various types of computer readable media and interfaces for various other types of computer readable media. Electronic system 600 includes bus 608, processing unit(s) 612, system memory 604, read-only memory (ROM) 610, permanent storage device 602, input device interface 614, output device interface 606, and network interface 616, or subsets and variations thereof.

Bus 608 collectively represents all system, peripheral, and chipset buses that communicatively connect the numerous internal devices of electronic system 600. In one or more implementations, bus 608 communicatively connects processing unit(s) 612 with ROM 610, system memory 604, and permanent storage device 602. From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. One or more implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such as random access memory. System memory 604 stores any of the instructions and data that processing unit(s) 612 needs at runtime. In one or more implementations, the processes of the subject disclosure are stored in system memory 604, permanent storage device 602, and/or ROM 610. From these various memory units, processing unit(s) 612 retrieves instructions to execute and data to process in order to execute the processes of one or more implementations.

Bus 608 also connects to input and output device interfaces 614 and 606. Input device interface 614 enables a user to communicate information and select commands to the electronic system. Input devices used with input device interface 614 include, for example, alphanumeric keyboards and pointing devices (also called "cursor control devices"). Output device interface 606 enables, for example, the display of images generated by electronic system 600. Output devices used with output device interface 606 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, bus 608 also couples electronic system 600 to a network (not shown) through network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system for reduced pair Ethernet transmission, the system comprising:
    an interleaver that is operable to:
        receive sets of four code symbols from a physical channel sub-layer (PCS) encoder, wherein each code symbol of each set of four code symbols is associated with one of four channels and each set of four code symbols corresponds to one of a plurality of data items encoded by the PCS encoder; and
        interleave the sets of four code symbols to generate a plurality of interleaved code symbols;
    a serializer that is operable to serialize the plurality of interleaved code symbols to generate a plurality of interleaved and serialized code symbols; and
    a transmitter that is operable to transmit the plurality of interleaved and serialized code symbols over an Ethernet medium comprising a single twisted pair of wires.

2. The system of claim 1, wherein the transmitter is further operable to transmit the plurality of interleaved and serialized code symbols as a plurality of five-level Pulse Amplitude Modulated signals over the Ethernet medium comprising the single twisted pair of wires.

3. The system of claim 1, wherein each code symbol of at least one of the sets of four code symbols is associated with a different channel of the four channels.

4. The system of claim 1, wherein the physical channel sub-layer (PCS) encoder comprises a trellis coded modulation (TCM) encoder.

5. The system of claim 1, wherein the interleaver comprises a convolutional interleaver.

6. The system of claim 1, wherein the transmitter comprises a physical medium dependent (PMD) transmitter.

7. The system of claim 1, further comprising:
    a receiver that is operable to receive the plurality of interleaved and serialized code symbols over the Ethernet medium comprising the single twisted pair of wires;
    a deserializer and a deinterleaver that are operable to deserialize and deinterleave the plurality of interleaved and serialized code symbols; and
    a decoder that is operable to determine, for at least one of the plurality of deinterleaved and deserialized code symbols, a first channel of the four channels that is associated with the at least one of the plurality of interleaved and serialized code symbols and decode the plurality of deinterleaved and deserialized code symbols based on the first channel of the four channels that is determined to be associated with the at least one of the plurality of interleaved and serialized code symbols to recover at least one of the sets of four code symbols.

8. The system of claim 7, wherein the decoder is further operable to determine the first channel of the four channels that is associated with the at least one of the plurality of deinterleaved and deserialized code symbols by determining that the at least one of the plurality of deinterleaved and deserialized code symbols satisfies a first coding rule associated with the first channel of the four channels.

9. The system of claim 8, wherein the decoder is further operable to:
    determine, for another one of the plurality of deinterleaved and deserialized code symbols, a second channel of the four channels that is associated with the another one of the plurality of deinterleaved and deserialized code symbols by determining that the another one of the plurality of deinterleaved and deserialized code symbols satisfies a second coding rule associated with the second channel of the four channels; and
    determine an interleaver depth parameter based on the second channel of the four channels determined to be associated with the another of the plurality of deinterleaved and deserialized code symbols and the first channel of the four channels determined to be associated with the at least one of the plurality of deinterleaved and deserialized code symbols.

10. The system of claim 9, wherein the deserializer and the deinterleaver are further operable to deserialize and deinterleave the plurality of interleaved and serialized code symbols based on the interleaver depth parameter.

11. The system of claim 7, wherein the receiver comprises a physical medium dependent (PMD) receiver.

12. The system of claim 7, wherein the deserializer and deinterleaver are further operable to provide the at least one of the sets of four code symbols to a trellis coded modulation (TCM) decoder.

13. The system of claim 7, wherein the deinterleaver comprises a convolutional deinterleaver.

14. A method for reduced pair Ethernet transmission, the method comprising:
- receiving sets of four code symbols from a physical channel sub-layer (PCS) encoder, wherein each code symbol of each set of four code symbols is associated with one of four channels and each set of four code symbols corresponds to one of a plurality of data items encoded by the PCS encoder;
- interleaving and serializing the sets of four code symbols to generate a plurality of interleaved and serialized code symbols;
- transmitting the plurality of interleaved and serialized code symbols over an Ethernet medium comprising a single twisted pair of wires;
- receiving the plurality of interleaved and serialized code symbols over the Ethernet medium comprising the single twisted pair of wires;
- deserializing and deinterleaving the plurality of interleaved and serialized code symbols;
- determining, for at least one of the plurality of deinterleaved and deserialized code symbols, a first channel that is associated with the at least one of the plurality of interleaved and serialized code symbols based at least on an equation associated with the first channel that is satisfied by the at least one of the plurality of interleaved and serialized code symbols; and
- decoding the plurality of deinterleaved and deserialized code symbols based on the first channel determined to be associated with the at least one of the plurality of deinterleaved and deserialized code symbols.

15. The method of claim 14, wherein the transmitting the plurality of interleaved and serialized code symbols over the Ethernet medium comprising the single twisted pair of wires further comprises transmitting the plurality of interleaved and serialized code symbols as a plurality of five-level Pulse Amplitude Modulated signals over the Ethernet medium comprising the single twisted pair of wires.

16. The method of claim 14, wherein each code symbol of at least one of the sets of four code symbols is associated with a different channel of the four channels.

17. The method of claim 14, wherein the determining, for at least one of the plurality of deinterleaved and deserialized code symbols, a first channel that is associated with the at least one of the plurality of interleaved and serialized code symbols further comprises:
- determining the first channel of the four channels that is associated with the at least one of the plurality of deinterleaved and deserialized code symbols by determining that the at least one of the plurality of deinterleaved and deserialized code symbols satisfies a first coding rule associated with the first channel of the four channels.

18. The method of claim 17, further comprising:
- determining, for another one of the plurality of deinterleaved and deserialized code symbols, a second channel of the four channels that is associated with the another one of the plurality of deinterleaved and deserialized code symbols by determining that the another one of the plurality of deinterleaved and deserialized code symbols satisfies a second coding rule associated with the second channel of the four channels; and
- determining an interleaver depth parameter based on the second channel of the four channels determined to be associated with the another of the plurality of deinterleaved and deserialized code symbols and the first channel of the four channels determined to be associated with the at least one of the plurality of deinterleaved and deserialized code symbols.

19. The method of claim 18, wherein the deserializing and deinterleaving the plurality of interleaved and serialized code symbols further comprises:
- deserializing and deinterleaving the plurality of interleaved and serialized code symbols based on the interleaver depth parameter.

20. A non-transitory machine-readable medium embodying instructions that, when executed by a machine, allow the machine to perform a method for reduced pair Ethernet transmission, the method comprising:
- receiving a plurality of interleaved and serialized code symbols over an Ethernet medium comprising a single twisted pair of wires, the plurality of interleaved and serialized code symbols corresponding to sets of four code symbols that are each associated with one of a plurality of data items encoded by a physical channel sub-layer (PCS) encoder;
- deserializing and deinterleaving the plurality of interleaved and serialized code symbols;
- determining, for at least one of the plurality of deinterleaved and deserialized code symbols, a first channel that is associated with the at least one of the plurality of interleaved and serialized code symbols based at least on an equation that is associated with the first channel; and
- decoding the plurality of deinterleaved and deserialized code symbols based on the first channel determined to be associated with the at least one of the plurality of deinterleaved and deserialized code symbols.

* * * * *